United States Patent [19]

Kantor et al.

[11] Patent Number: 5,353,817

[45] Date of Patent: Oct. 11, 1994

[54] HAIR GROOMING DEVICE

[75] Inventors: Isaak Kantor, Rosh Pina; Moshe Fish, Kibbutz Ma'ayan Baruch; Yoel Zur, Korazim, all of Israel

[73] Assignee: Mepro Epilady Ltd., Upper Galilee, Israel

[21] Appl. No.: 31,557

[22] Filed: Mar. 15, 1993

[30] Foreign Application Priority Data

Mar. 15, 1992 [IL] Israel ................................. 101234

[51] Int. Cl.⁵ ................................. A45D 24/00
[52] U.S. Cl. ................................. 132/219; 132/118; 132/148; 132/161; 132/271; 119/86; 119/87
[58] Field of Search ............... 132/117, 118, 119.1, 132/125, 148, 151, 152, 153, 161, 219, 271; 119/83, 86, 87, 156; 43/112; 128/393

[56] References Cited

U.S. PATENT DOCUMENTS

| | | |
|---|---|---|
| 312,487 | 2/1885 | McGinnis . |
| 384,561 | 6/1888 | Busch . |
| 456,952 | 8/1891 | Hambay . |
| 456,953 | 8/1891 | Hinsdale . |
| 792,887 | 6/1905 | Erstling ........................ 132/151 |
| 936,208 | 10/1909 | Bacon et al. ................. 128/393 |
| 1,165,485 | 12/1915 | Adams . |
| 1,724,984 | 8/1929 | Wildey . |
| 1,728,080 | 9/1929 | Roberts ......................... 128/393 |
| 1,820,768 | 8/1931 | Barker .......................... 128/393 |
| 1,820,769 | 8/1931 | Barker .......................... 128/393 |
| 1,880,619 | 10/1932 | Wildey ......................... 128/393 |
| 2,021,008 | 11/1935 | Ericsson et al. ............... 219/21 |
| 3,394,716 | 7/1968 | Andersen ...................... 132/125 |
| 3,892,247 | 7/1975 | Andersen ...................... 132/219 |
| 3,897,794 | 8/1975 | Branch ......................... 132/11 R |
| 3,927,684 | 12/1975 | Lam ............................. 132/119.1 |
| 4,213,460 | 7/1980 | Weiner ......................... 119/87 |
| 4,729,147 | 3/1988 | Armbruster ................... 15/314 |
| 4,815,232 | 3/1989 | Rawski ......................... 43/136 |
| 4,936,259 | 6/1990 | Owen et al. ................... 132/151 |
| 5,072,746 | 12/1991 | Kantor ......................... 132/118 |
| 5,178,168 | 1/1993 | Kantor ......................... 132/118 |

Primary Examiner—Gene Mancene
Assistant Examiner—Frank A. LaViola
Attorney, Agent, or Firm—Ladas & Parry

[57] ABSTRACT

A hand-held hair grooming device comprising a housing adapted to be held in the hand of the user, an array including a plurality of electrically conductive tines extending outwardly from the housing, apparatus for mounting the plurality of tines in the housing, apparatus for applying an electric potential between adjacent times whereby lice or other pests suitably disposed between adjacent tines are electrocuted and apparatus for selectable displacement of some of the plurality of tines relative to others of said plurality of tines to assist in cleaning thereof.

7 Claims, 8 Drawing Sheets

HAIR GROOMING DEVICE

FIELD OF THE INVENTION

The present invention relates to hair grooming devices generally.

BACKGROUND OF THE INVENTION

A great variety of hair grooming devices are known in the patent literature. U.S. Pat. Nos. 2,201,008; 1,724,984; 456,953; 456,952; 384,561 and 312,487 all relate to electric combs that are battery powered for energizing hair roots and scalp. In U.S. Pat. No. 2,021,008, each row of tines is insulated from the other and each comb element is of opposite polarity from its neighbor such that the hair strand is intended to complete an electrical circuit between adjacent comb elements.

U.S. Pat. No. 3,897,794 describes a pocket-sized battery powered hair comb having oscillating teeth for smoothing difficult hair.

U.S. Pat. No. 4,815,232 shows a comb for the removal and capture of fleas and other pests.

U.S. Pat. No. 1,165,485 describes an electrocuting device, not a comb, having spaced metal bars.

U.S. Pat. No. 4,729,147 describes a portable self-contained pet groomer and flea annihilator including a vacuum device which removes loose hair, dandruff and the like to a remote location at which fleas are electrocuted by an electrical charge.

SUMMARY OF THE INVENTION

The present invention seeks to provide a hand-held hair grooming device which is effective to electrically destroy lice, fleas or other pests.

There is thus provided in accordance with a preferred embodiment of the present invention a hand-held hair grooming device comprising a housing adapted to be held in the hand of the user, an array including a plurality of electrically conductive tines extending outwardly from the housing, apparatus for mounting the plurality of tines in the housing, apparatus for applying an electric potential between adjacent times whereby lice or other pests suitably disposed between adjacent tines are electrocuted and apparatus for selectable displacement of some of the plurality of tines relative to others of said plurality of tines to assist in cleaning thereof.

In accordance with a preferred embodiment of the present invention, every second tine may be displaced relative to the tines adjacent thereto.

According to one embodiment of the present invention, the relative displacement of the tines occurs in a plane identical or parallel to a plane in which the lines extend.

According to an alternative embodiment of the present invention, the relative displacement of the tines occurs about an axis perpendicular to the longitudinal axes of the tines.

In accordance with a preferred embodiment of the invention, the apparatus for applying an electrical potential includes battery operated apparatus for supplying a voltage higher than the battery voltage.

Further in accordance with a preferred embodiment of the invention, the battery operated apparatus is operative for supplying a voltage of at least 200 volts across adjacent tines.

Additionally in accordance with a preferred embodiment of the invention, tines which are maintained at different potentials extend different lengths outward from the housing.

Also in accordance with a preferred embodiment of the invention there is also provided apparatus for producing a user sensible output indication of the occurrence of lice electrocution. Similarly there may also be provided apparatus for producing a user sensible output indication of proper operation of the apparatus.

The apparatus for producing preferably comprises apparatus for providing an audible output indication, such as an audio output device interconnected with the apparatus for applying an electrical potential.

Further in accordance with an preferred embodiment of the invention, certain tines have insulation along portions of their exposed lengths to prevent inadvertent arcing due to bending of adjacent tines.

Additionally in accordance with a preferred embodiment of the invention, the apparatus for mounting may be modular to permit different sets of tines to be removably mounted on the housing.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figures 1A, 1B:
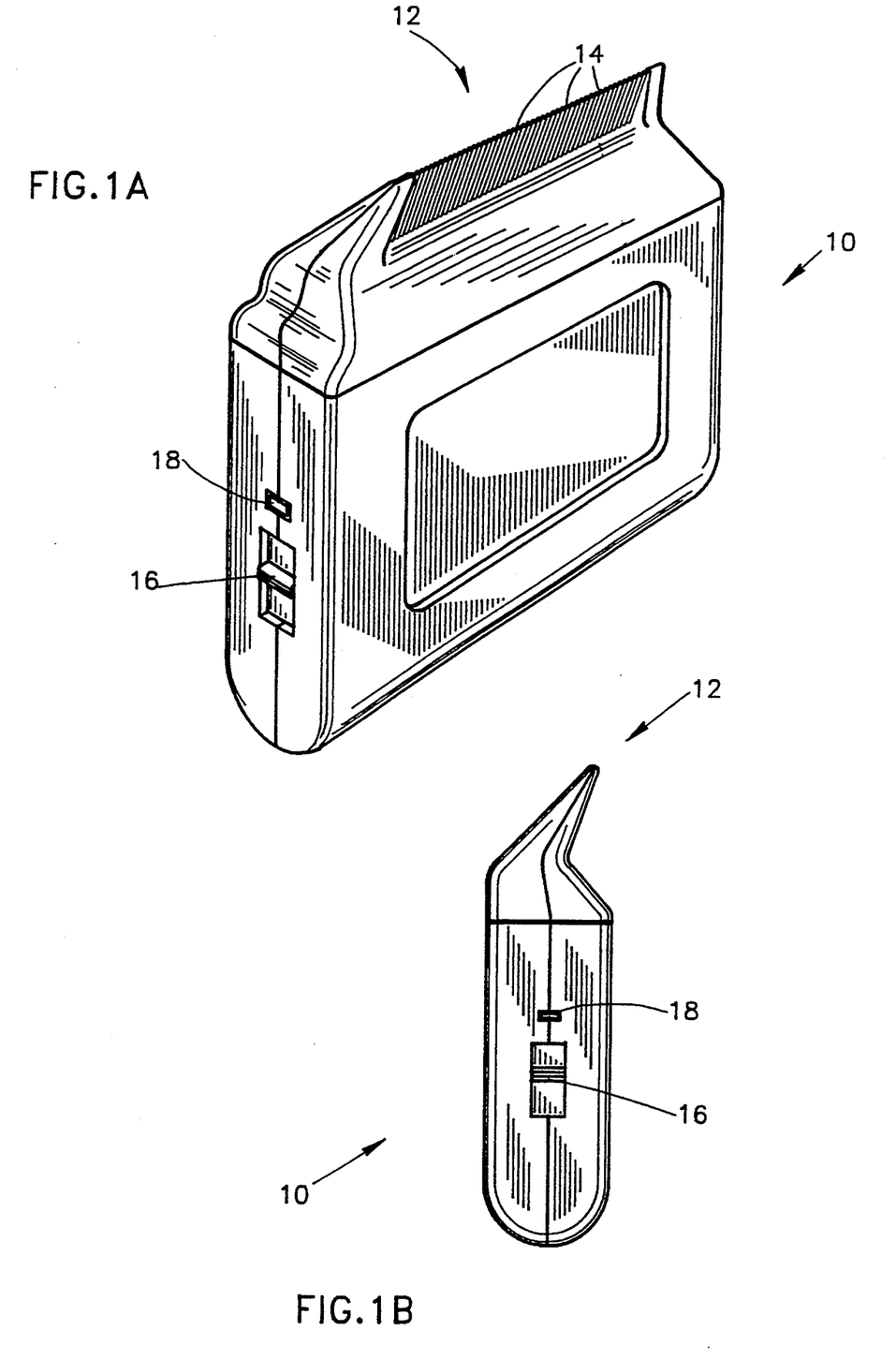
FIGS. 1A and 1B are respective perspective and side view pictorial illustrations of a grooming device constructed and operative in accordance with a preferred embodiment of the present invention.

Reference is now made to FIGS. 1A and 1B, which illustrate a hair grooming device constructed and operative in accordance with a preferred embodiment of the present invention. It will be appreciated that the hair grooming device described herein is particularly configured for use on human hair. Notwithstanding this, the present invention is not limited to devices suitable for use with human hair and is also applicable to pet grooming devices.

The grooming device of FIGS. 1A and 1B comprises a housing 10 which is configured to be readily held in a human hand. The housing 10 contains therewithin a battery and circuitry shown in FIG. 3 and defines a mounting arrangement for an array 12 of electrically conductive tines 14. According to a preferred embodiment of the invention, the mounting arrangement is such that replacement tine arrays 12 can be readily snapped in and out of operative engagement with the housing 10, but this need not be the case. Preferably an ON-OFF switch 16 and an operation indicator light 18 are also mounted on the housing 10.

In the illustrated embodiment, the tines 14 of array 12 are arranged in a plane which is tilted with respect to the plane of the housing 10. Alternatively any other suitable arrangement of tines 14 may be employed.

Figure 2A:
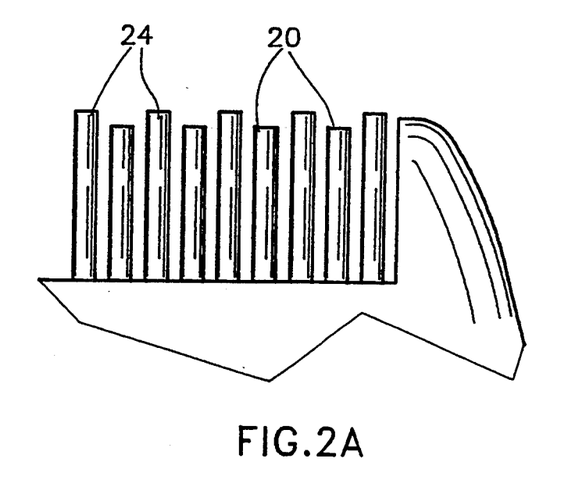
FIGS. 2A and 2B illustrate removably mountable arrays of mutually offset tines useful in the device of FIGS. 1A and 1B respectively with and without insulation.
Figure 2B:
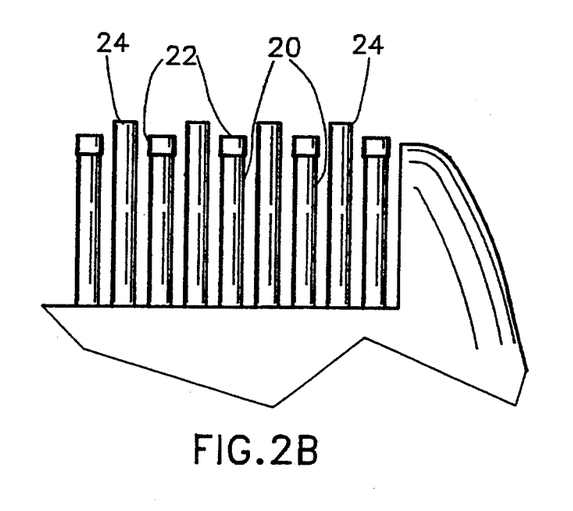

Reference is now made to FIGS. 2A and 2B, which illustrate a preferred arrangement of tines 14. Preferably the tines are formed of wire of thickness 0.8 mm and are separated from each other by an air gap of 0.2–0.3 mm. In accordance with a preferred embodiment of the invention, each second tine is offset in its length with respect to its neighbor. A preferable tine length is about 1 cm. and a preferable offset is 0.5 mm. The offset normally will prevent the closing of an electrical circuit when the ends of the tines 14 are held against a flat surface.

In accordance with an alternative embodiment of the invention, the tines may be closer together, sufficiently to enable electrocution of lice eggs.

According to a preferred embodiment of the invention, the shorter tines, indicated by reference numeral 20 in FIG. 2B are provided with an electrically insulative layer 22, such as a layer of lacquer, in order to prevent arcing or closing of an electrical circuit if the longer tines, indicated by reference numeral 24 are bent towards them.

Figure 3:
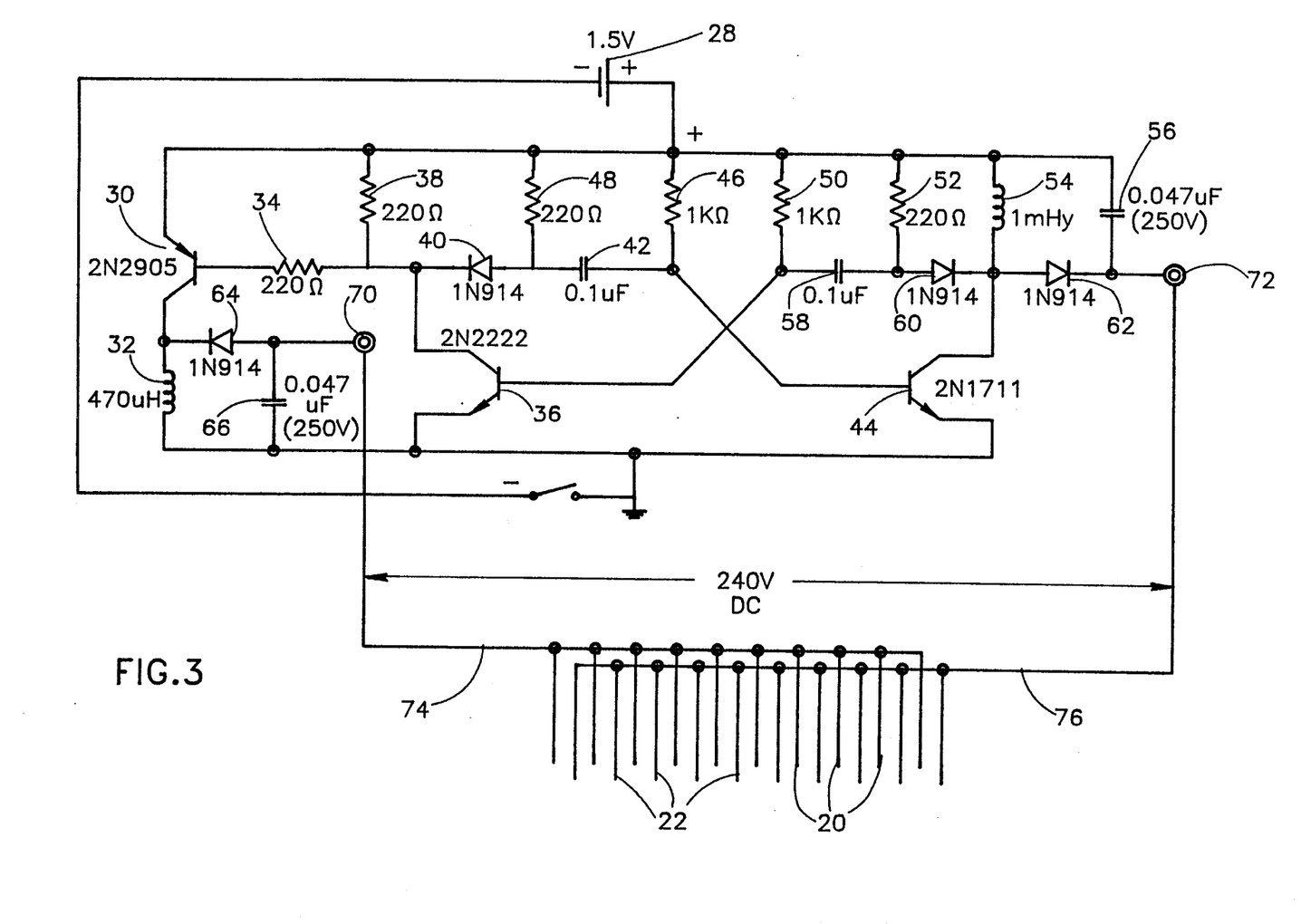
FIG. 3 illustrates circuitry for supplying electrical energy to the tines of the grooming device of FIGS. 1A and 1B.

Reference is now made to FIG. 3, which illustrates electrical circuitry for providing a high-voltage output to the tines 14. Generally speaking, the circuitry of FIG. 3 comprises an astable multi-vibrator which charges a coil during every cycle. In every cycle, the coil discharges a capacitor, or a network of capacitors, acting as a voltage multiplier. The charge accumulating in the capacitors may reach in excess of 200 volts. The capacitor located at the output to the tines accumulates a charge capacity of about 5 microcoulombs on average, which is sufficient to electrocute lice. Alternatively any other suitable circuitry for providing a high voltage output sufficient to electrocute lice or similar hair-bound pests may be employed.

The circuitry of FIG. 3 is preferably powered by an ordinary 1.5 volt dry cell 28, such as one of AA size. A positive voltage of 1.5 volts is supplied to the emitter of a transistor 30, such as a 2N2905, whose collector is connected via an inductor 32, preferably of value 470 microHenry to ground. The base of transistor 30 is coupled via a resistor 34, preferably of value 220 ohm, to the collector of a transistor 36, such as a 2N2222, whose emitter is connected to ground.

The junction of resistor 34 and the collector of transistor 36 is coupled to a positive voltage of 1.5 volts via a resistor, preferably of value 220 ohms and is connected via a diode 40 such as a 1N914, and a capacitor 42, preferably of value 0.1 microfarad to the base of a transistor 44, such as a 2N1711, whose emitter is connected to ground. The junction of capacitor 42 and the base of transistor 44 is coupled to a positive voltage of 1.5 volts via a resistor 46, preferably of value 1 Kohm. The junction of capacitor 42 and diode 40 is coupled to a positive voltage of 1.5 volts via a resistor 48, preferably of value 220 ohms.

Resistors 50 and 52, preferably having respective values of 1 Kohm and 200 ohms, an inductor 54, preferably having a value of 1 mHy and a capacitor 56, preferably having a value of 0.047 microfarad and a 250 V rating are connected in parallel, at one side thereof to a positive voltage of 1.5 volts. The opposite sides of resistors 50 and 52 are interconnected by a capacitor 58 preferably having a value of 0.1 microfarad. The opposite sides of resistor 52 and inductor 54 are interconnected by a diode 60, such as an 1N914, and the opposite sides of inductor 54 and capacitor 56 are interconnected by a diode 62, such as a 1N914.

The junction of capacitor 56 and resistor 50 is connected to the base of transistor 36 and the junction of diodes 60 and 62 and inductor 54 is coupled to the collector of transistor 44.

The junction of inductor 32 and the collector of transistor 30 is coupled via a diode 64, such as a 1N914 and a capacitor 66, preferably having a value of 0.047 microfarad and a 250 Volt rating, to ground.

A potential difference of 250 volts is defined across first and second taps 70 and 72, tap 70 being defined at the junction of diode 64 and capacitor 66 and tap 72 being defined at the junction between capacitor 56 and diode 62. Preferably tap 70 is coupled to a bus 74 connected to the shorter tines 20, while tap 72 is coupled to a bus 76 connected to the longer tines 22 which are interdigitated with the shorter tines 20.

It will be appreciated by persons skilled in the art that the circuitry of FIG. 3 provides a voltage across each adjacent pair of tines which is significantly in excess of that provided by the battery 28. When a louse or other pest, having a conductivity significantly greater than human hair, is located between adjacent tines, an electrical circuit is closed thereacross, producing a current of about 80 microamperes to 10 milliamperes, sufficient to kill the louse or other pest. It is significant that since the electrical conductivity of hair is low, an electrical circuit is not closed thereacross.

Figure 4:
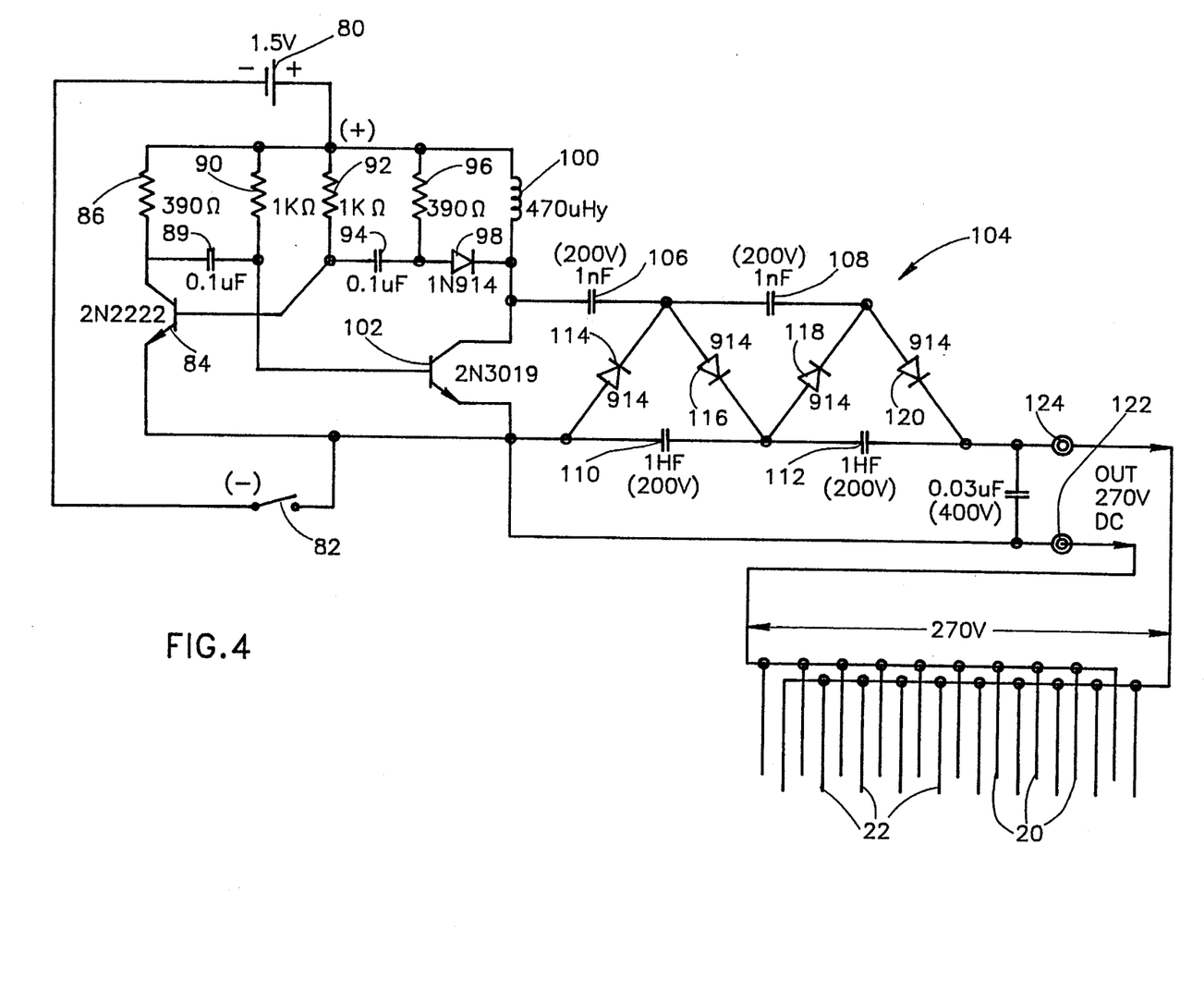
FIG. 4 illustrates preferred circuitry for supplying electrical energy to the tines of the grooming device of FIGS. 1A and 1B.

Reference is now made to FIG. 4, which illustrates a preferred circuit for electrocution of lice in the hair. A 1.5 volt voltage source 80, such as an AA size dry cell, is employed such that its negative terminal is coupled across a switch 82 to the emitter of a transistor 84. The collector of transistor 84 is coupled across a resistor 86, typically of value 390 ohm, to the positive terminal of the voltage source 80.

Connected in parallel to resistor 86 are a capacitor 88, such as an 0.1 microfarad capacitor 89 and a resistor 90, typically of value 1 Kohm. The base of transistor 84 is preferably connected across a 1 Kohm resistor 92 to the positive terminal of voltage source 80. A capacitor 92, typically of value 0.1 microfarad, is coupled in series with a resistor 96, typically of value 390 ohms, between the junction of the base of transistor 84 and resistor 92 and the positive terminal of voltage source 80. A diode 94, such as a 1N914, is coupled in series with an inductor 100, typically of value 470 microHenry, between the junction of capacitor 94 and resistor 96 and the positive terminal of voltage source 80.

The junction of capacitor 89 and resistor 90 is coupled to the base of a transistor 102, such as a 2N3019. The collector of transistor 102 is coupled to the junction of diode 98 and inductor 100 and the emitter of transistor 102 is coupled to the emitter of transistor 84. The emitter and collector of transistor 102 are connected across a capacitive grid, indicated generally by reference numeral 104 and including four capacitors 106, 108, 110 and 112, each of value 1 nanofarad and a rating of 200 Volts, and four diodes 114, 116, 118 and 120, each typically a 914.

One set of tines, indicated by reference number 20, typically the shorter tines, is coupled via a voltage supply terminal 122 to the negative terminal of voltage source 80 via switch 82, while the other set of tines, indicated by reference number 22, is coupled via a voltage supply terminal 124 to the output of capacitive grid 104. The voltage difference between voltage supply terminals 122 and 124 is typically 270 volts.

Figure 5:
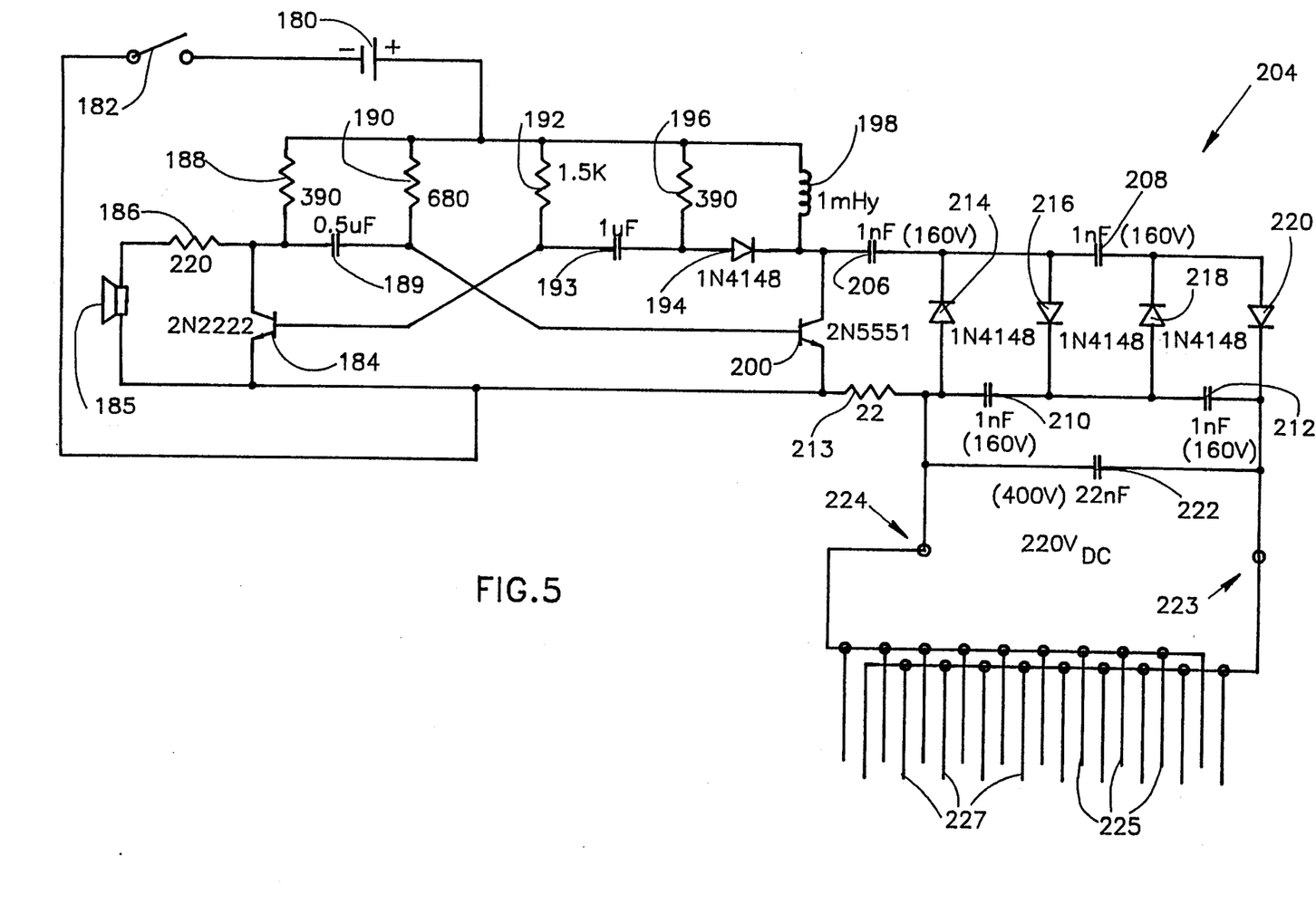
FIG. 5 illustrates alternative preferred circuitry for supplying electrical energy to the tines of the grooming device of FIGS. 1A and 1B.

Reference is now made to FIG. 5, which illustrates an additional preferred circuit for electrocution of lice in the hair. A 1.5 volt voltage source 180, such as an AA size dry cell, is employed such that its negative terminal is coupled across a switch 182 to the emitter of a transistor 184, such as a 2N2222. The collector of transistor 184 is coupled across an audio output device 185 such as a miniature piezoelectric loudspeaker and across first and second resistors in series, 186 and 188, typically of respective values 220 ohm and 390 ohm, to the positive terminal of the voltage source 180.

Connected in parallel to resistor 188 are a capacitor 189 such as an 0.5 microfarad capacitor 189 and a resistor 190, typically of value 680 ohm. The base of transistor 184 is preferably connected across a 1.5 Kohm resistor 192 to the positive terminal of voltage source 180. A capacitor 193, typically of value 0.1 microfarad, is coupled in series with a resistor 196, typically of value 390 ohms, between the junction of the base of transistor 184 and resistor 192 and the positive terminal of voltage source 180. A diode 194, such as a 1N4148, is coupled in series with an inductor 198, typically of value 1 milli-Henry, between the junction of capacitor 193 and resistor 196 and the positive terminal of voltage source 180.

The junction of capacitor 189 and resistor 190 is coupled to the base of a transistor 200, such as a 2N5551. The collector of transistor 200 is coupled to the junction of diode 194 and inductor 198 and the emitter of transistor 200 is coupled to the emitter of transistor 184. The emitter and collector of transistor 200 are connected across a voltage multiplier, indicated generally by reference numeral 204 and including four capacitors 206, 208, 210 and 212, each of value 1 nanofarad and a rating of 160 Volts, a resistor 213 of value 22 ohms and four diodes 214, 216, 218 and 220, each typically a 1N4148. A capacitor 222, typically of value 22 nanoFarad with a 400 V rating is coupled between the junction of resistor 213 and capacitor 210 and the junction of capacitor 212 and diode 220. A 220 Volt DC output terminal, including a positive voltage supply contact 223 and a negative voltage supply contact 224, is defined across the capacitor 222.

One set of tines, indicated by reference number 225, typically the shorter tines, is coupled to voltage supply contact 224, while the other set of tines, indicated by reference numeral 227, is coupled to voltage supply contact 223.

The circuitry of FIG. 5 is operative to provide an audio output during device operation. The output is not present when either the circuitry or the battery 180 is not operating properly. When lice are electrocuted, the audio output varies temporarily, thereby providing an audio indication to the user of the presence and eradication of lice.

Figure 6A:
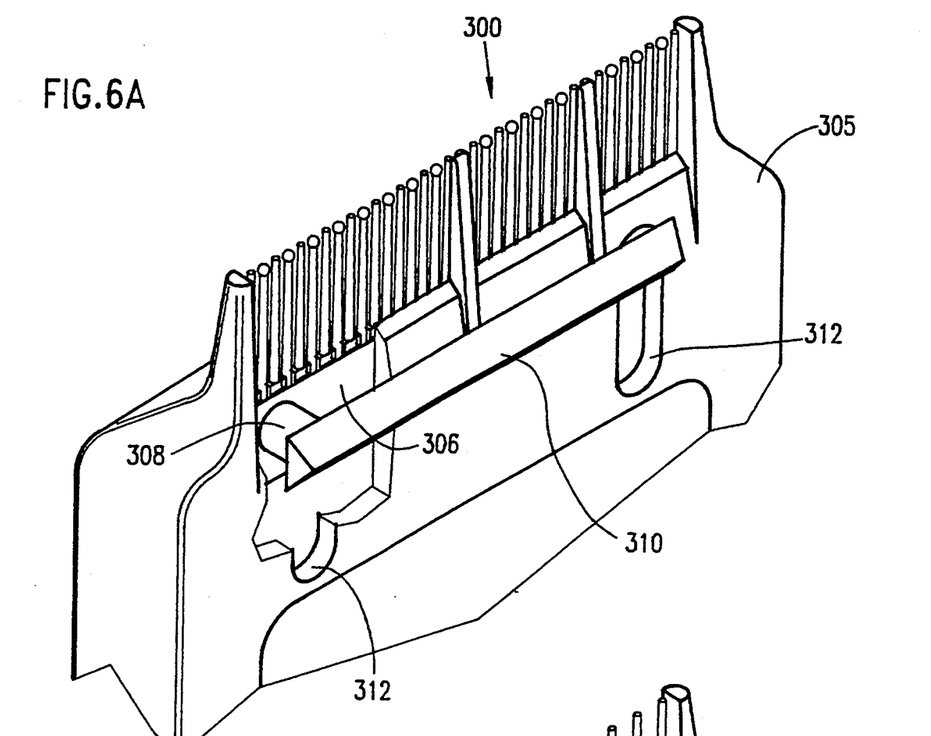
FIGS. 6A and 6B are pictorial illustrations of part of a grooming device constructed with retractable tines in accordance with a preferred embodiment of the present invention in respective extended and retracted orientations.
Figure 6B:
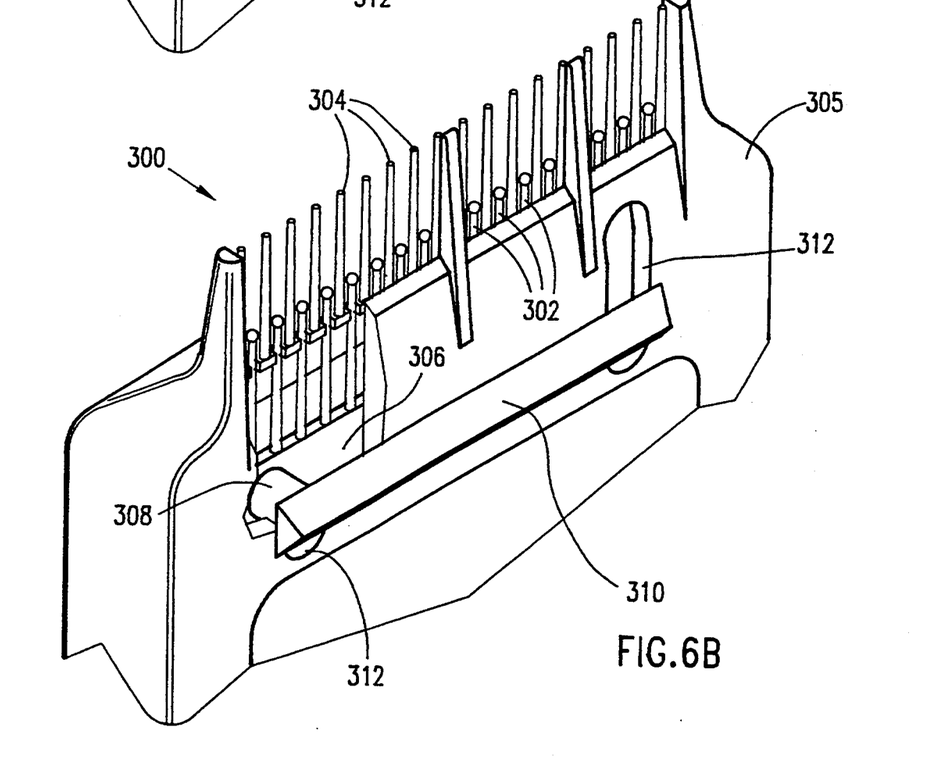

Reference is now made to FIGS. 6A and 6B, which illustrate another preferred embodiment of the present invention wherein some of the tines are displaceable relative to others, in order to assist in cleaning. In the embodiment of FIGS. 6A and 6B, a single line array 300 of tines is shown, it being appreciated that the array of tines may equally comprise a plurality of lines of tines.

As seen in FIGS. 6A and 6B, preferably every second tine in a row of tines is displaceable with respect to the tines adjacent thereto. In the illustrated embodiment, the tines 302 which are connected to a voltage source are displaced relative to those tines 304 which are grounded and fixed with respect to a housing 305. Alternative arrangements are also possible.

In the embodiment of FIGS. 6A and 6B, the tines 302 which are displaceable relative to the fixed tines 304 are mounted on a base 306 which is attached by means of an attachment member 308 to a handle 310, which slides longitudinally in slots 312 in a plane parallel to the plane of the tines 302 and 304. FIG. 6A shows an extended orientation of tines 302 for normal operation in lice removal, while FIG. 6B shows a retracted orientation of tines 302 for cleaning of the tines. Tines 302 are cleaned automatically as they are retracted, while tines 304 may readily be wiped clean, when tines 302 are retracted.

Figure 7A:
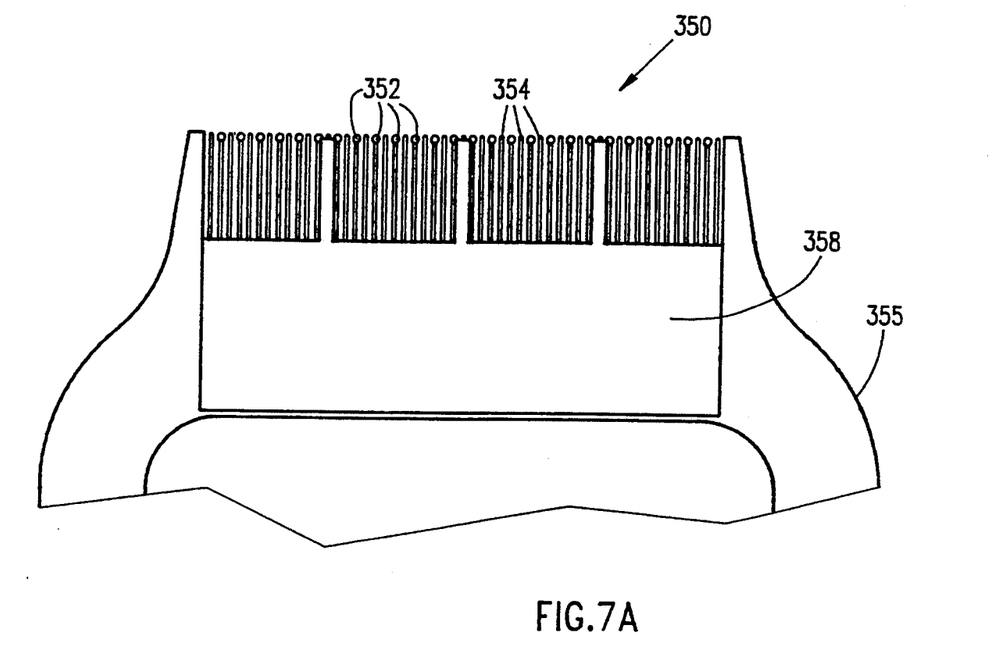
FIGS. 7A, 7B and 7C are respectively a pictorial illustration and two sectional illustrations of two different operative orientations of a grooming device constructed and operative in accordance with another preferred embodiment of the invention.
Figure 7B:
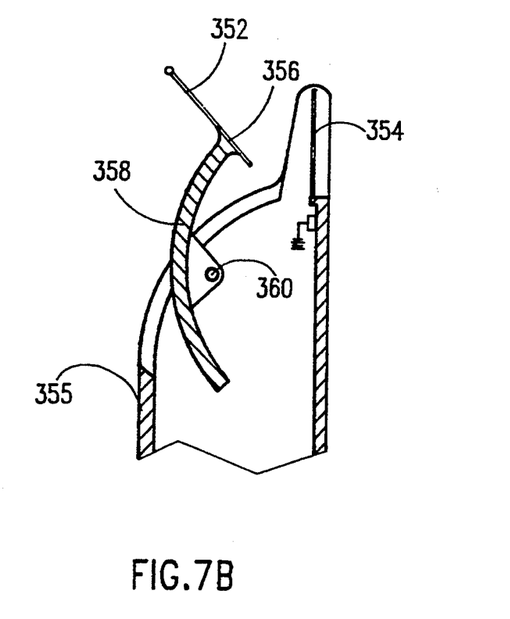
Figure 7C:
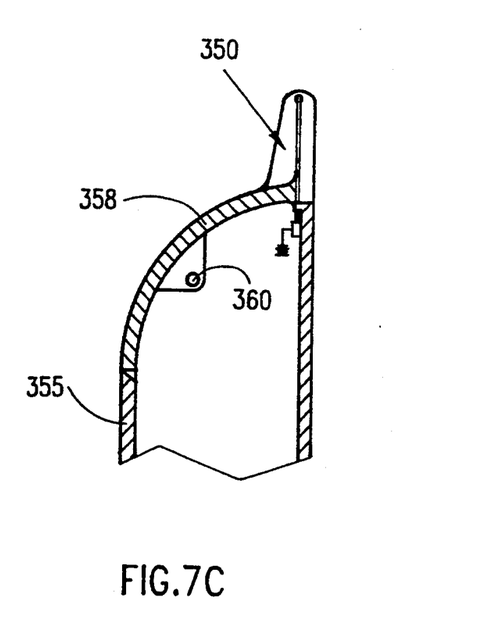

Reference is now made to FIGS. 7A, 7B and 7C which illustrate another preferred embodiment of the present invention wherein some of the tines are displaceable relative to others, in order to assist in cleaning. In the embodiment of FIGS. 7A-7C a single line array 350 of tines is shown, it being appreciated that the array of tines may equally comprise a plurality of lines of tines.

As seen in FIGS. 7A-7C, preferably every second tine in a row of tines is displaceable with respect to the tines adjacent thereto. In the illustrated embodiment, the tines 352 which are connected to a voltage source when in their normal operative orientation as illustrated in FIG. 7C, are displaced from the orientation shown in FIG. 7C, to the orientation shown in FIG. 7B, relative to those tines 354 which are fixed with respect to a housing 355. Alternative arrangements are also possible.

In the embodiment of FIGS. 7B-7C, the tines 352 which are displaceable relative to the fixed tines 354 are mounted on a base 356 which is attached to a rotatable housing portion 358. The rotatable housing portion 358 is rotatably mounted onto the remainder of the housing 355 for rotation about an axis 360.

FIG. 7C shows an orientation of tines 352 for normal operation in lice removal, while FIG. 7B shows a rotated orientation of tines 352 for cleaning of the tines.

Figure 8A:
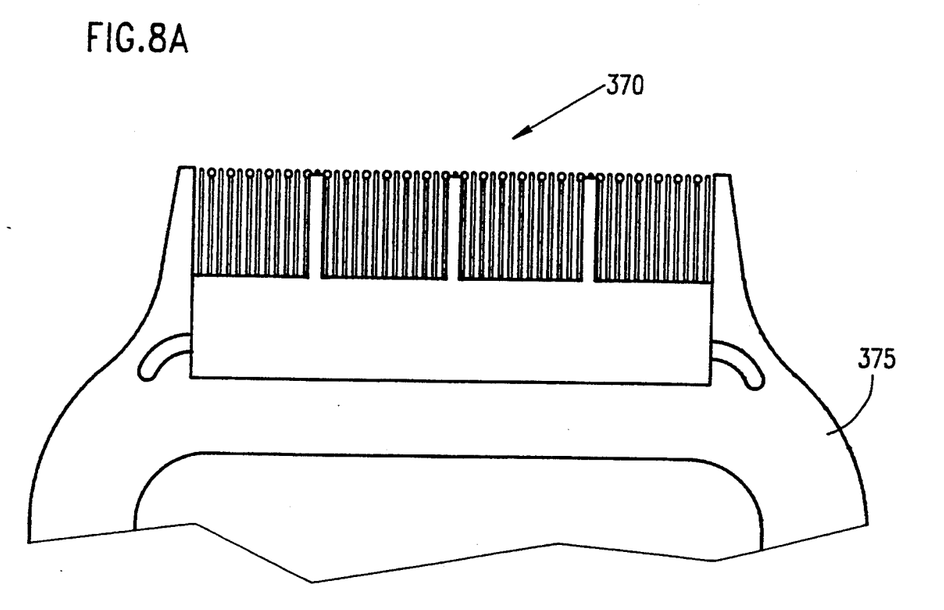
FIGS. 8A, 8B and 8C are respectively a pictorial illustration and two sectional illustrations of two different operative orientations of a grooming device constructed and operative in accordance with yet another preferred embodiment of the invention.
Figure 8B:
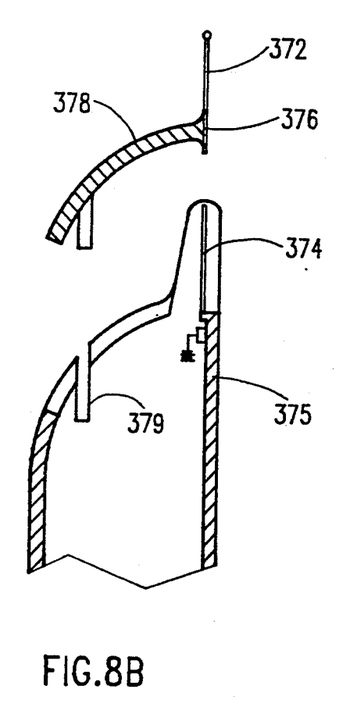
Figure 8C:
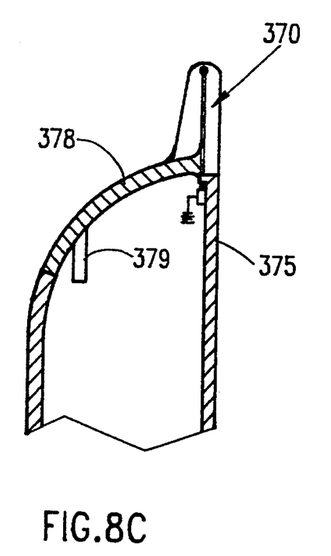

Reference is now made to FIGS. 8A, 8B and 8C which illustrate still another preferred embodiment of the present invention wherein some of the tines are displaceable relative to others, in order to assist in cleaning. In the embodiment of FIGS. 8A-8C a single line array 370 of tines is shown, it being appreciated that the array of tines may equally comprise a plurality of lines of tines.

As seen in FIGS. 8A-8C, preferably every second tine in a row of tines is displaceable with respect to the tines adjacent thereto. In the illustrated embodiment, the tines 372 which are connected to a voltage source when in their operative orientation as shown in FIG. 8C, are displaced from their FIG. 8C orientation, relative to those tines 374 which are grounded and fixed with respect to a housing 375. Alternative arrangements are also possible.

In the embodiment of FIGS. 8A–8C, the tines 372 which are displaceable relative to the fixed tines 374 are mounted on a base 376 which is attached to a removable housing portion 378. The removable housing portion 378 is removably mounted onto a suitable support 379 associated with housing 375.

FIG. 8C shows an orientation of tines 372 for normal operation in lice removal, while FIG. 8B shows a disengaged orientation of tines 372 for cleaning of the tines.

It will be appreciated that the present invention is not limited by what has been particularly shown and described hereinabove. Rather the scope of the present invention is defined only by the claims which follow:

We claim:

1. A hand-held hair grooming device comprising:
   a housing adapted to be held in the hand of the user:
   an array of a plurality of electrically conductive tines;
   support means mounting the plurality of tines in the housing such that the tines extend outwardly from the housing;
   means for applying an electric potential between adjacent tines whereby lice or other pests suitably disposed between adjacent tines are electrocuted;
   said support means including means securing a first group of tines to said housing in fixed position and means securing a second group of tines to said housing for displacement between a first position in which the second group of tines are aligned with the first group of tines and a second position in which the second group of tines are displaced away from the first group of tines; and
   means for moving the second group of tines as a common assembly between said first and second positions.

2. A device as claimed in claim 1, wherein said second group of tines are constituted by every second tine in said array.

3. A device as claimed in claim 2, wherein said tines of said first and second groups are disposed in a common plane when the tines of said second group are in said first position.

4. A device as claimed in claim 3, wherein said second group of tines in said second position are linearly displaced in fixed attitude in said plane away from the first group of tines.

5. A device as claimed in claim 3, wherein said means which supports said second group of tines to said housing for displacement includes a support by which said assembly of said second group of tines is pivotably movable between said first and second positions.

6. A device as claimed in claim 3, wherein said common assembly of the second group of tines is removable from said housing when going from said first to said second position.

7. A device as claimed in claim 3, wherein the first group of tines are electrically grounded and the second group of tines are connected to receive electric potential.

* * * * *